(12) United States Patent
Suzuki

(10) Patent No.: US 6,945,001 B1
(45) Date of Patent: Sep. 20, 2005

(54) BUILDING USING EXTERNAL FACING MATERIAL FOR CONSTRUCTION

(76) Inventor: Masao Suzuki, 5-13, 2-chome Kajino-cho, Koganei-shi, Tokyo 184-0002 (JP)

( * ) Notice: Subject to any disclaimer, the term of this patent is extended or adjusted under 35 U.S.C. 154(b) by 0 days.

(21) Appl. No.: 10/258,876

(22) PCT Filed: May 1, 2000

(86) PCT No.: PCT/JP00/02871

§ 371 (c)(1),
(2), (4) Date: Oct. 30, 2002

(87) PCT Pub. No.: WO01/83910

PCT Pub. Date: Nov. 8, 2001

(51) Int. Cl.[7] ................................................. E04B 2/00
(52) U.S. Cl. .................... 52/582.1; 52/586.1; 52/592.1; 52/309.9; 52/309.14
(58) Field of Search ........................... 52/592.1, 582.1, 52/584.1, 796.1, 309.9, 309.14, 586.1

(56) References Cited

U.S. PATENT DOCUMENTS

| 3,124,222 | A | * | 3/1964 | Mote ............................ 52/463 |
| 3,175,652 | A | * | 3/1965 | Brekell et al. ............. 52/127.3 |
| 3,948,347 | A | * | 4/1976 | Rutledge ..................... 181/291 |
| 4,037,377 | A | * | 7/1977 | Howell et al. .............. 52/309.9 |
| 4,045,927 | A | * | 9/1977 | Diaz ........................... 52/127.11 |
| 4,316,351 | A | * | 2/1982 | Ting ............................ 52/309.9 |
| 4,984,400 | A | * | 1/1991 | Bockmiller ................... 52/241 |
| 5,373,678 | A | * | 12/1994 | Hesser ........................ 52/592.1 |
| 5,613,338 | A | * | 3/1997 | Esposito ..................... 52/588.1 |
| 6,314,699 | B1 | * | 11/2001 | West ........................... 52/489.1 |
| 6,347,495 | B1 | * | 2/2002 | Conterno ................... 52/483.1 |
| 6,412,239 | B1 | * | 7/2002 | Miller ......................... 52/204.1 |
| 6,711,864 | B2 | * | 3/2004 | Erwin ......................... 52/582.1 |

FOREIGN PATENT DOCUMENTS

| JP | 2-47461 | | 2/1990 | |
| JP | 04115048 | A * | 4/1992 | .......... E04D 3/366 |
| JP | 05230906 | A * | 9/1993 | ............ E04B 2/74 |
| JP | 5-331989 | | 12/1993 | |
| JP | 11-28023 | | 2/1999 | |

* cited by examiner

Primary Examiner—Peter M. Cuomo
Assistant Examiner—Stephen D'Adamo
(74) Attorney, Agent, or Firm—Wenderoth, Lind & Ponack, L.L.P.

(57) ABSTRACT

A building using pieces of structural facing is capable of simplifying the operation of construction and exalting the feasibility of construction, applicable to all conceivable portions of a building, and capable of liberally cutting the cost incurred in the construction. Each of the pieces of structural facing 2 is constituted of a heat-insulating sound-insulating core material 3 coated on both sides thereof with an outer panel 5 and an inner panel 6 both made of a steel sheet and connected to the framework of a building 1 and concatenated with adjoining pieces of facing 2.

8 Claims, 13 Drawing Sheets

BUILDING USING EXTERNAL FACING MATERIAL FOR CONSTRUCTION

BACKGROUND OF THE INVENTION

1. Technical Field

This invention relates to a building using structural facing and more particularly to a building using structural facing for the execution of works of laying an outer wall and a roof on a building.

2. Description of the Related Art

As new facing panels to take the place of structural facing wooden panels used for the execution of works of laying walls and other similar coats on a building, facing panels made from sheet members, such as sheet members of steel, aluminum and stainless steel, have heretofore been made available.

These facing panels undergo such a process as packing the interior of a sheet member with resin or foamed material. With the object of enabling these facing panels to form fast union during the construction of a wall surface, for example, they have their generally lateral parts formed in such a shape as permits the opposed lateral parts of adjoining panels to overlap each other in order that the adjoining facing panels may be directly joined or they are each provided with joining members capable of providing adjoining facing panels with required union in order that the adjoining facing panels may be bonded through these joining members. When the facing panels are to be fixed in the form of a wall surface, for example, braces are used as reinforcing members.

At the construction site, it has become increasingly difficult to secure labor resources of skilled workers due to the advancing senility of workers. The desirability of rationalizing the techniques of construction, therefore, has been finding general recognition.

In the execution of an operation of constructing a building by using facing panels that are formed of steel, however, the facing panels have the possibility of complicating the structure of the building even to the extent of rendering the works involved in the execution difficult.

Specifically, the facing panels have entailed such problems as complicating the structures of union at the sites of union allocated on the prospective wall surface, necessitating the use of braces during the construction of the wall surface of a given building, and consequently demanding extra labor and cost.

In the construction of a roof of a building, the works involved therein are troublesome because the component members and the procedure of construction are different from those used in the construction of the wall surface.

This invention has been originated in the light of such conventional problems and is directed toward providing a building using structural facing which is capable of simplifying works of execution and heightening the feasibility of building construction, enjoying extensive applicability to all portions of a building, and allowing a liberal cut in the cost incurred during the construction.

SUMMARY OF THE INVENTION

The present invention provides a building using pieces of structural facing, wherein each of the pieces of facing is constituted of an elongate outer panel and an elongate inner panel both made of a steel sheet and a heat-insulating and sound-insulating core material nipped between the outer and inner panels; the outer panel has a bent part formed in an end thereof to extend in a width direction of each of the pieces of facing, the bent part having an extending end thereof folded to form a folded part; the inner panel has a folded part formed therein, the folded part of the inner panel being joined to the folded part of the outer panel; and the building has connecting members having fitting members, each of the fitting members being disposed in the width direction of each of the pieces of facing and meshed with the bent part of the outer panel and the folded part of the inner panel to concatenate adjoining pieces of facing, thereby constructing an outer wall surface of the building.

Each of the connecting members comprises a rod member provided at one terminal thereof with a male thread and at the other terminal thereof with a fitting part which is furnished at one terminal part thereof with a tying part, and a fitting member having an insertion hole bored therein, and the rod member is set in place, with the fitting part thereof non-rotatably fixed in the insertion hole of the fitting member.

Each of the pieces has folded parts against which the fitting member of each connecting member collides, the rod member of the connecting member is penetrated through a furring strip of the building through a shielding member, and the folded parts are set in place on the furring strip, with the male thread of the rod member fastened with a nut.

The building may further comprise frames fixed to the pieces, rails perpendicularly intersecting and fixed to the frames, upward turned hooks provided on the rails and an outer wall member having groove parts and hanging on the hooks through the grooves, wherein the pieces, frames with the hooks, rails and outer wall member constitute an outer wall surface of the building.

Otherwise, the building may further comprise frames fixed to the pieces, rails perpendicularly intersecting and fixed to the frames, convex parts provided on the rails and an outer wall tile having depressed parts in which the convex parts are fitted, wherein the pieces, frames, rails with the convex parts and outer wall tile with the depressed parts constitute an outer wall surface of the building.

The invention further provides a building using pieces of structural facing, wherein each of the pieces of facing is constituted of an elongate outer panel and an elongate inner panel both made of a steel sheet and a heat-insulating and sound-insulating core material nipped between the outer and inner panels; the outer panel has a bent part formed in an end thereof to extend in a width direction of each of the pieces of facing, the bent part having an extending end thereof folded to form a folded part; the inner panel has a folded part formed therein, the folded part of the inner panel being joined to the folded part of the outer panel; the building has connecting members having fitting members, each of the fitting members being disposed in the width direction of each of the pieces of facing and meshed with the bent part of the outer panel and the folded part of the inner panel to concatenate adjoining pieces of facing; and the concatenated pieces of facing is used as a roof of the building.

The building may further comprise a trough fixed to a terminal region of the roof and a connecting member for fixing the roof to a retaining member of the building.

In the building, the pieces are fixed on roof retaining members of the building, and the building further comprises a waterproof sheet fixed on the pieces, pebbles and soil laid on the waterproof sheet, plants and grasses raised from the soil, and partition plates capable of retaining pebbles and soil disposed on the pieces at predetermined intervals.

DETAILED DESCRIPTION OF THE INVENTION

One example of the structural facing contemplated by this invention will be described in detail below with reference to embodiments.

Figure 1:
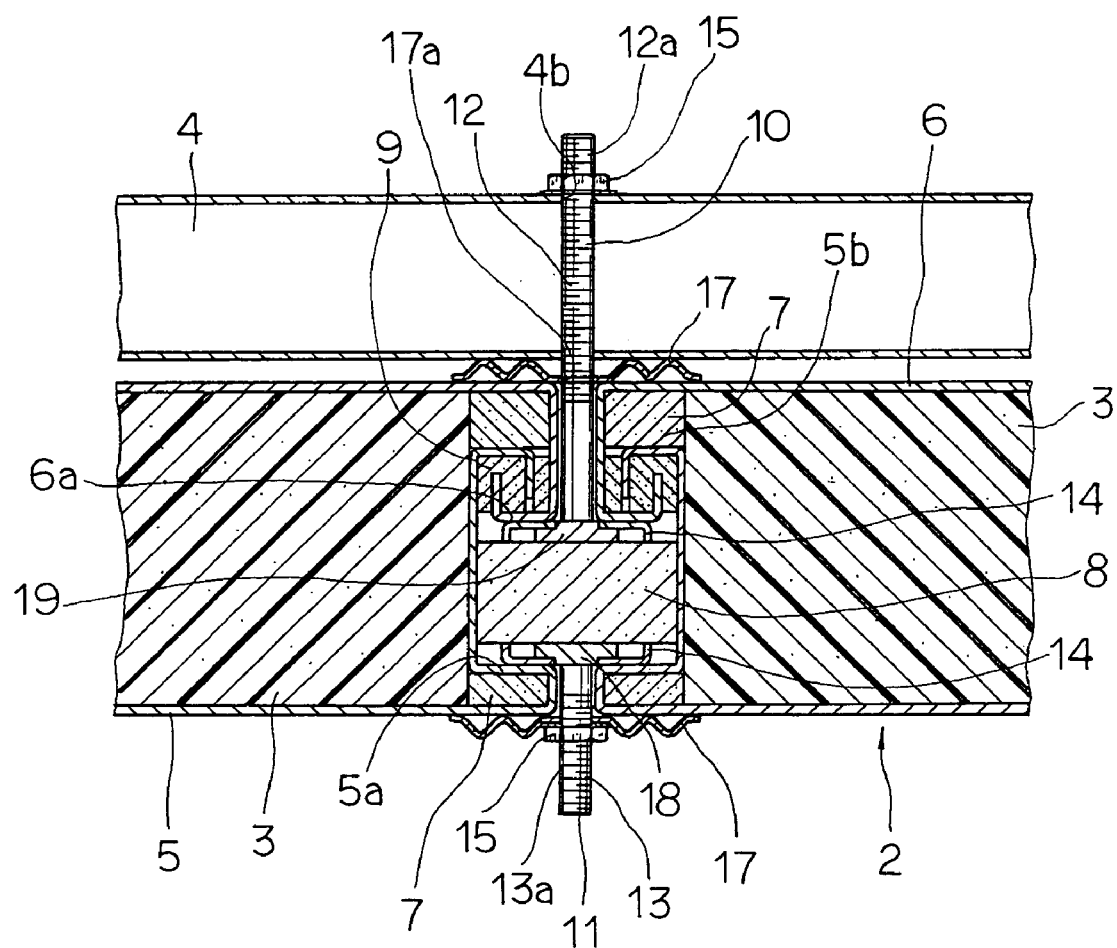
FIG. 1 is a cross section depicting one embodiment of the building using structural facing contemplated by this invention.
Figure 2:
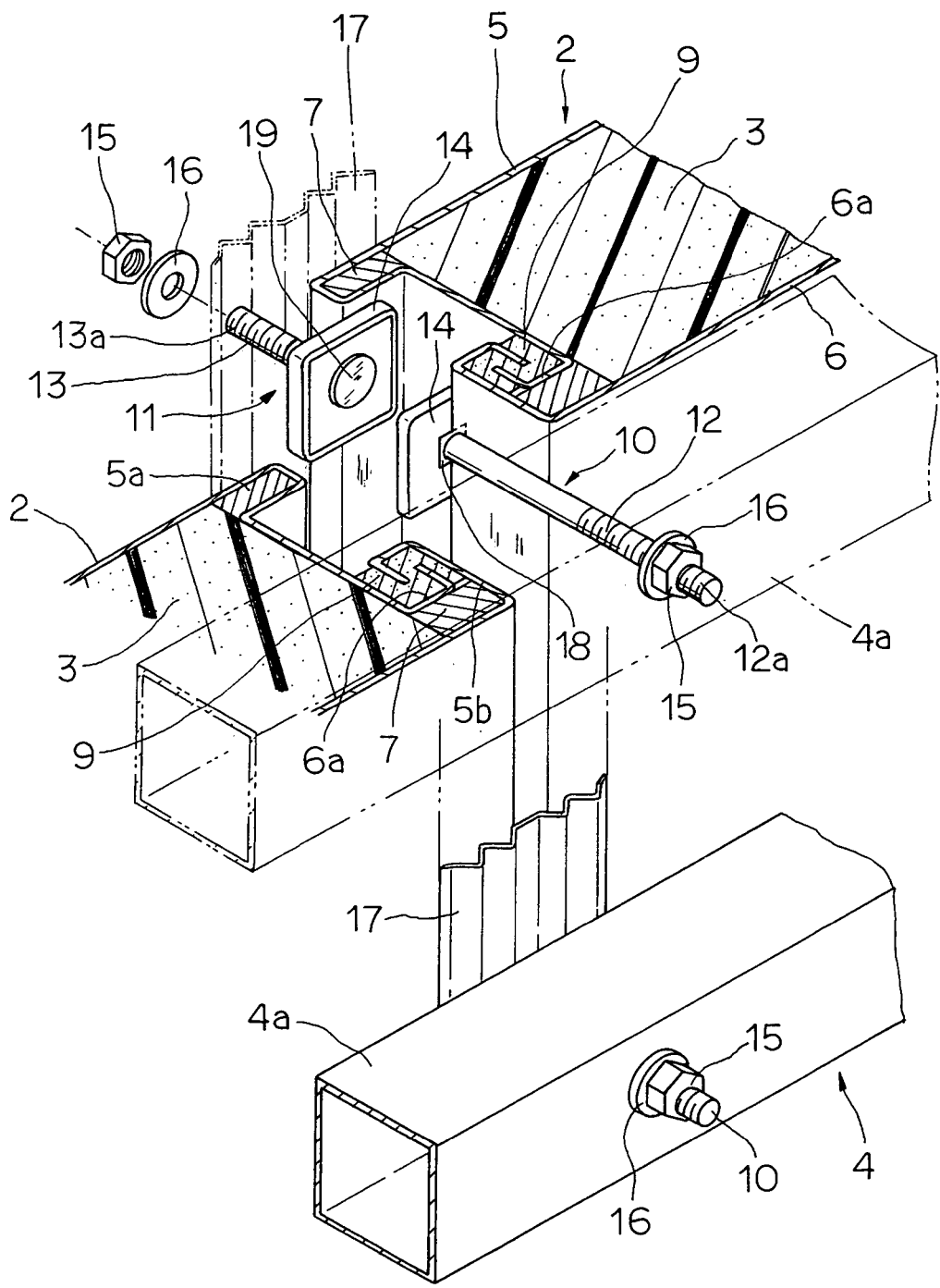
FIG. 2 is a perspective view depicting a fitting structure for the structural facing on the building according to this invention.

With reference to FIG. 1, facing 2 is formed by nipping a core material 3 possessed of heat insulating properties and sound insulating properties between an outer panel 5 and an inner panel 6 which are each produced by galvanizing an elongate thin-sheet member of steel and then coating the surface thereof with a frost-proof agent. The core material, an interstitial member 7, a nipping member 8 and a fixing member 9 are invariably made of an incombustible material which is obtained by solidifying a light-weight, water-resistant, readily processible powdery substance, such as calcium carbonate or calcium silicate.

The interstitial members 7 are each embedded as though inserted home in a recess which is defined by a bent part 5a formed by folding the outer panel 5 located outside the facing 2 in a cross section generally in the shape of three sides of a square, a folded part 5b formed by folding the terminal part of the outer panel 5, and the inner panel 6 located inside the facing 2.

The fixing members 9 are each serving the purpose of joining the terminal parts of the outer panel 5 and the inner panel 6 so as to integrate the outer panel 5 and the inner panel 6 with each other.

Denoted by reference numeral 4 is a furring strip that forms the framework of a building 1. This furring strip 4 is formed in a cross section generally in the shape of a rectangle and is constructed by combining lateral pipes 4a disposed parallel in the horizontal direction and longitudinal pipes 4a' disposed parallel in the vertical direction. Then, numeral 17 denotes a shielding member made of steel and disposed along the facing 2 at a height substantially equal to the height of the facing 2. This shielding member 17 is formed with a cross section generally of a corrugated shape and enabled to shield the contacting portion of the outer panel 5 or inner panel 6 adjoining the shielding member 17.

References numerals 10 and 11 denote connecting members. These connecting members 10 and 11 serve the purpose of fastening the facing 2 to the furring strip 4 and connecting the adjoining pieces of facing 2, 2 to each other as well as to construct a sheathing panel.

Rod members 12 and 13 respectively of the connecting members 10 and 11 have male threads 12a and 13a formed respectively thereon. They are provided at the other terminal positions thereof respectively with approximately rectangular fitting parts 18, 18. The fitting parts 18, 18 are provided at the leading ends thereof with circular tying members 19, 19.

Reference numeral 14 denotes a fitting member which is formed in the shape of an approximately rectangular shallow receptacle. This fitting member 14 is provided approximately at the central position thereof with a rectangular insertion hole 14a capable of fixing the fitting part 18 in place. When the rod members 12 and 13 are inserted with the male threads 12a and 13a on the lead into the insertion hole 14a and the fitting part 18 is fixed in the insertion hole 14a, the rod members 12 and 13 are prevented from rotating relative to the fitting member 14 and are prevented by the tying members from being removed in the directions of insertion.

The connecting members 10 and 11 are so formed as to vary the lengths of the rod members 12 and 13. The rod members 12 and 13 can be formed in arbitrary lengths, depending on the thickness of the facing 2 and the dimensions of the pipes 4a and 4a' forming the furring strip 4. In combination with either one of the rod members 12 and 13, whichever better suits the occasion, the fitting member 14 may be used.

The construction of a wall surface of the building 1 will be described below with reference to FIG. 1 to FIG. 4.

For a start, a suitable tool is used to bore a hole 4b in advance in the furring strip 4 at the prospective fitting position of the facing 2 and the rod member 12 of the connecting member 10 is inserted into the hole 4b from the side of the facing 2. During this insertion, washers 16 are set one each first on a fitting hole 17a formed in the shielding member 17 and then on the hole 4b after the holes have passed the rod member 12 being inserted and nuts 15, which are each possessed of a female thread 15a capable of being screwed on the male thread 12a, are screwed in until the connecting member 10 is tacked to the furring strip 4.

In the ensuant state of the relevant components, folded parts 6a, 6a formed by folding the terminal parts of the inner panels 6 of the pieces of facing 2, 2 are pressed against the opposed surfaces of the fitting member 14 and the pieces of facing 2, 2 are tacked as held between the fitting member 14 and the shielding member 17.

Further, on the side of the outer panel 5, the bent part 5a of the outer panel 5 is nipped between the fitting member 14 and the shielding member 17 so as to set the connecting member 11 in place. By screwing the nuts 15 home on the male threads 13a after the washers 16 have been set in place and tightening the nuts 15, 15, it is made possible to fix the pieces of facing 2, 2 on the furring strip 4 and connect the pieces of facing 2, 2 to each other and finally construct a wall surface of the building 1.

The nipping member 8 is disposed so that it is nipped between the fitting members 14, 14 of the connecting members 10 and 11 and is adapted to fill the gap to be formed between the fitting members 14, 14. Thus, it is capable of preventing the connecting members 10 and 11 from being easily loosened and enabling the pieces of facing 2, 2 to be firmly connected.

When plural pieces of facing 2 are to be concatenated, the wall surface may be constructed by similarly setting these pieces of facing 2 on the furring strip 4 and adjoining them side by side.

Figure 3:
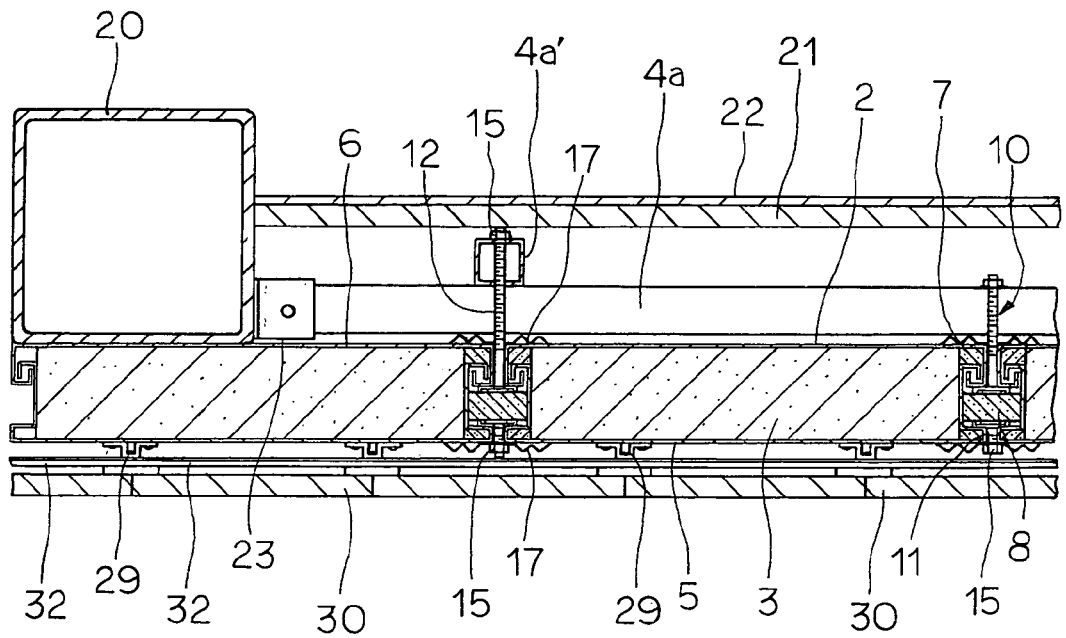
FIG. 3 is a cross section depicting another embodiment of the building using structural facing contemplated by this invention.
Figure 4:
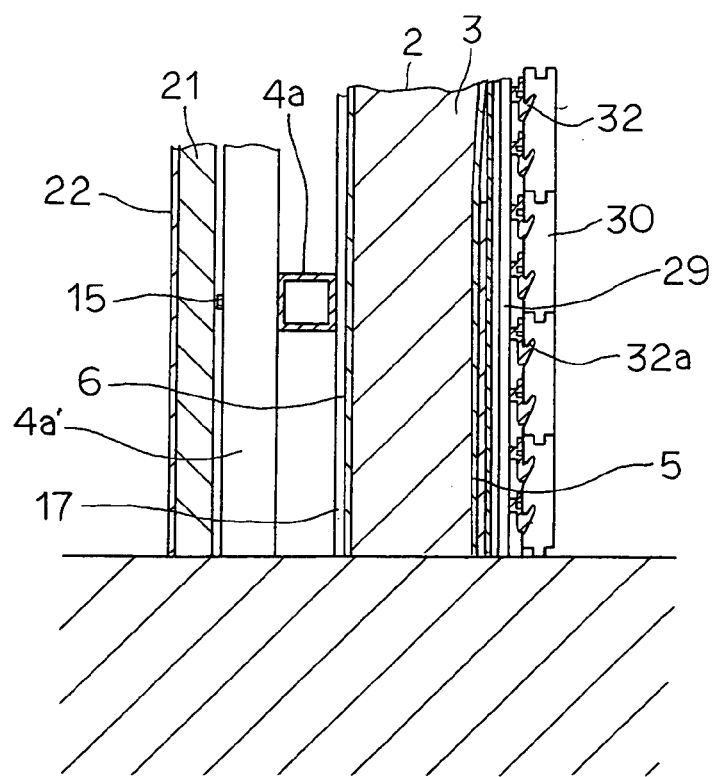
FIG. 4 is a magnified cross section of FIG. 3.

At the point at which the lateral pipe 4a and longitudinal pipe 4a' of the furring strip 4 intersect, the rod member 12 of the connecting member 10 is elongated, as illustrated in FIG. 3, so as to penetrate through the lateral pipe 4a and longitudinal pipe 4a', and is fixed in place with the nut 15.

The lateral pipe 4a has the neighborhood of the terminal part thereof fixed to a mounting bracket 23 having a cross section in the shape of three sides of a square with a means, such as a bolt, not shown in the diagram. This mounting bracket 23 is fixed to a support rod 20 that serves the purpose of supporting the building 1.

The support rod 20 further has fixed thereto as by means of adhesion a plate member 21 that has pasted thereto such a decorative interior material 22 so as to enable the interior of the building 1 to remain in a sealed state. The plate member 21 is so disposed as to contact the leading terminal of the rod member 12 in order that it may not shake after it has been set in place.

Figure 5:
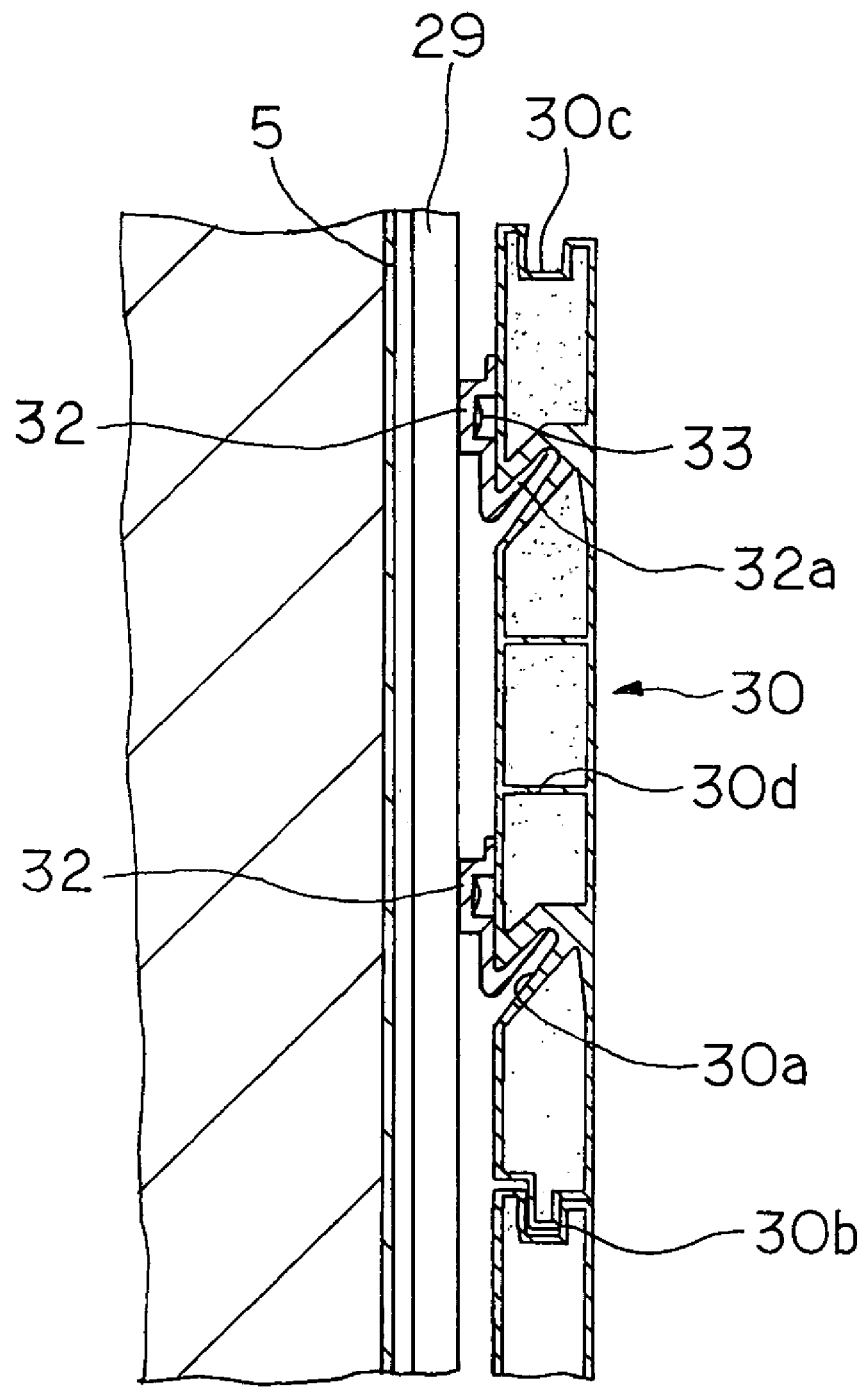
FIG. 5 is a partially magnified cross section of FIG. 4.
Figure 6:
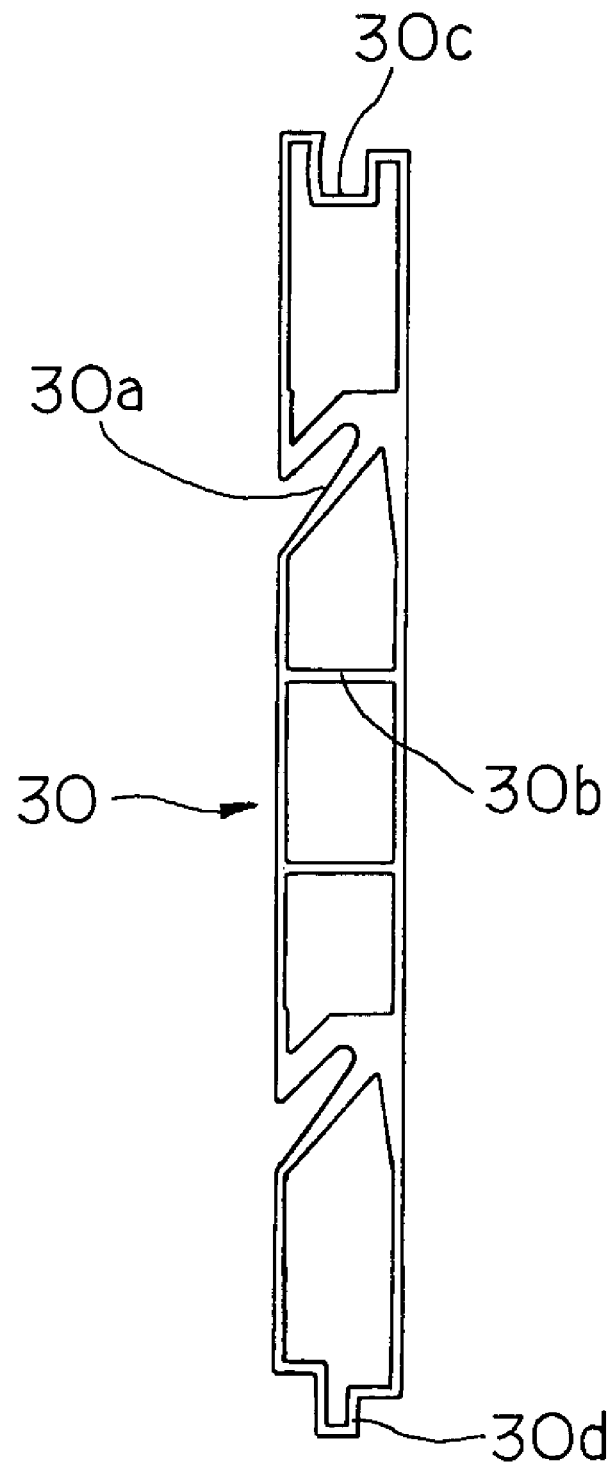
FIG. 6 is a side view of the facing.

With reference to FIG. 5, a decorative outer wall member 30 is disposed outside the facing 2. This outer wall member 30 is formed through extrusion or draw molding of a material, such as aluminum or other metal. In the present example, the outer wall member 30 is provided with upward groove parts 30a one each at two portions and is made to form at each of the upper and lower terminal parts thereof a depressed part 30c and a projected part 30b capable of fitting the depressed part 30c. It is further furnished in the interior thereof with a rib 30d so as to be reinforced and consequently molded in the shape of a small wall thickness.

Reference numeral 32 denotes a rail for fitting the outer wall member 30. This rail 32 is so fixed with a rivet 33 as to intersect a frame 29 perpendicularly. The frame 29 has a cross section approximately of a convex shape and may be disposed at the site of mutual connection of the pieces of facing 2, 2 and at other arbitrary position on the facing 2. The rail 32 is provided with a hook 32a that opens upward when the frame 29 is set in place.

In order for the outer wall member 30 to be set in place, it is so hung down as to mesh the groove part 30a of the outer wall member 30 with the hook 32a of the rail 32 and construct the outer wall surface of the building 1.

Figure 7:
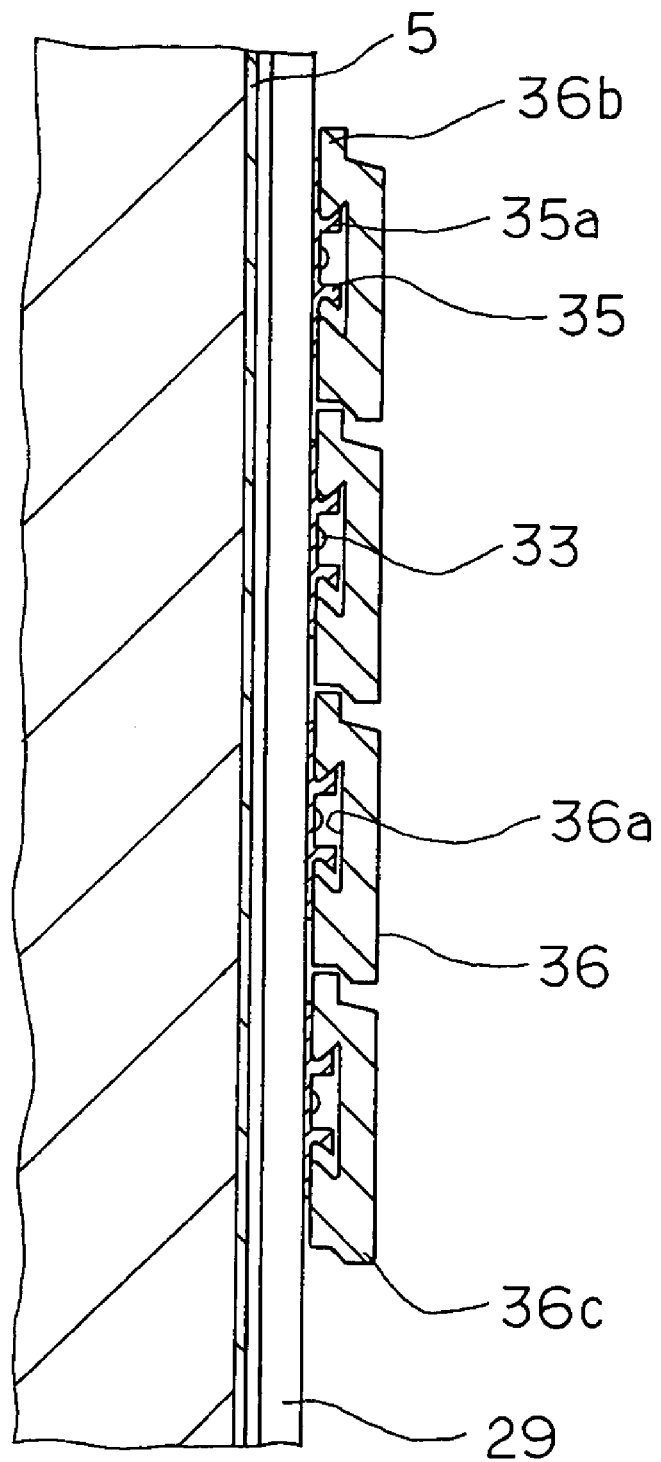
FIG. 7 is a cross section depicting a fitting structure for outer wall tiles.
Figure 8:
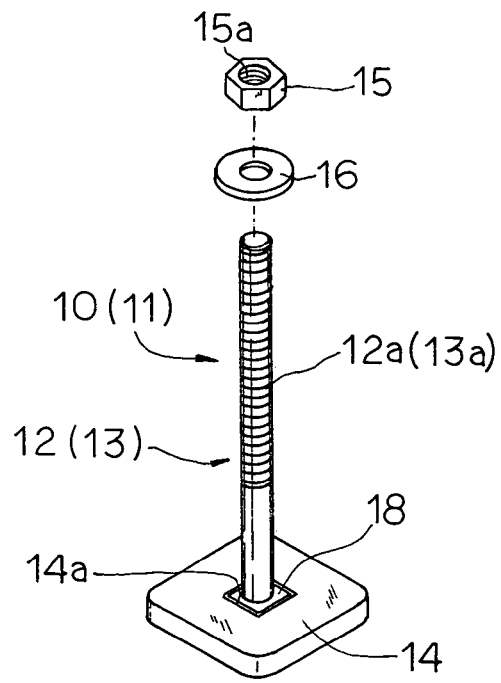
FIG. 8 is a referential perspective view depicting a connecting member.
Figure 9:
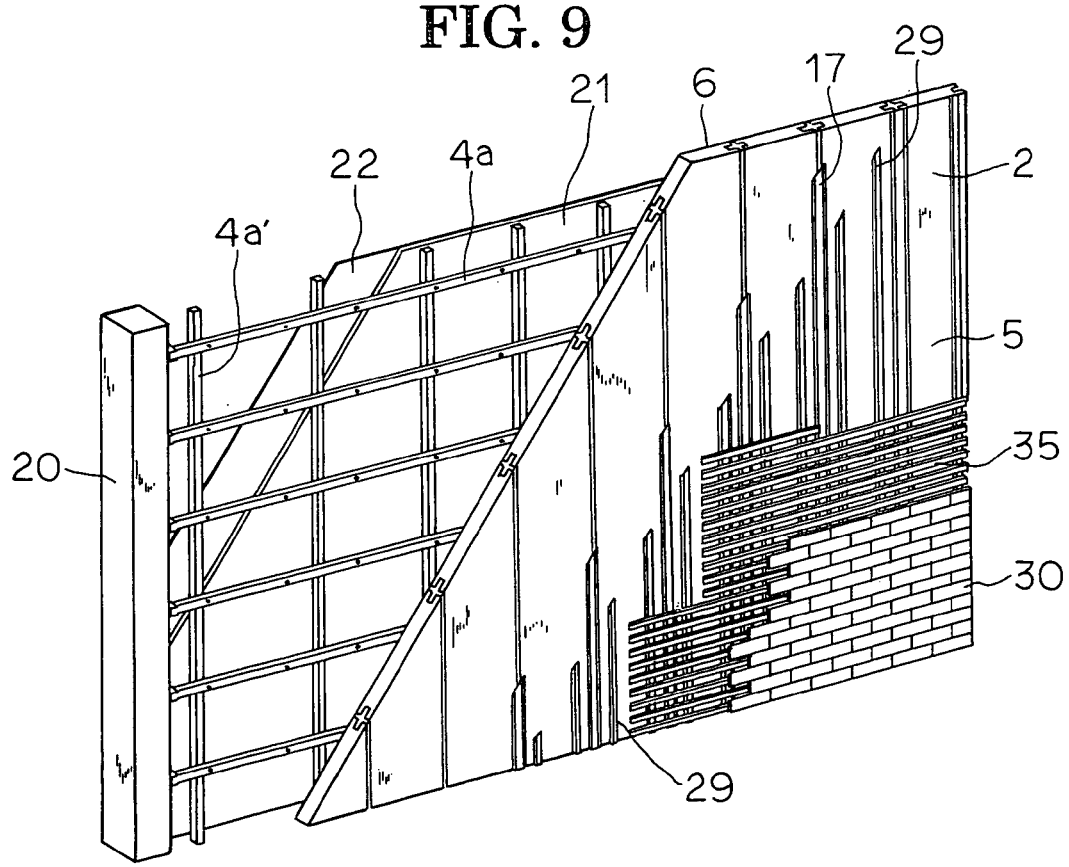
FIG. 9 is a referential perspective view depicting a fitting structure for structural facing on a building contemplated by this invention.

FIG. 7 is a cross section depicting the fitting structure of outer wall tiles 36 formed with tiles on the outer wall surface. These outer wall tiles 36 are each provided in a notch formed therein in a cross section approximately in the shape of a trapezoid with a concave part 36a so shaped as to be meshed with a convex part 35a of a rail 35. Further, the outer wall tiles 36 are each provided at each of the upper and lower terminal portions thereof with a depressed part 36c and a projected part 36b capable of being meshed with the depressed part 36c. The rail 35 is disposed so as to be fitted to the outer wall tiles 36.

The outer wall tiles 36 are so fitted that the depressed part 36a may be slid from the direction of the terminal surface thereof and meshed with the projected part 35a. At this time, a suitable adhesive member is applied to the opposed surfaces of the projected part 36b and depressed part 36c.

The outer wall member and outer tile 36, as portrayed in any of the diagrams, are invariably concatenated in the front-rear direction and the projected part 30b is meshed with the depressed part 30c after the outer wall member 30 has been set in place and the projected part 36b is fixed to the depressed part 36c after the outer wall tile 36 has been set in place. Thus, the individual outer walls are concatenated in the vertical direction to form a strong wall surface.

Figure 10:
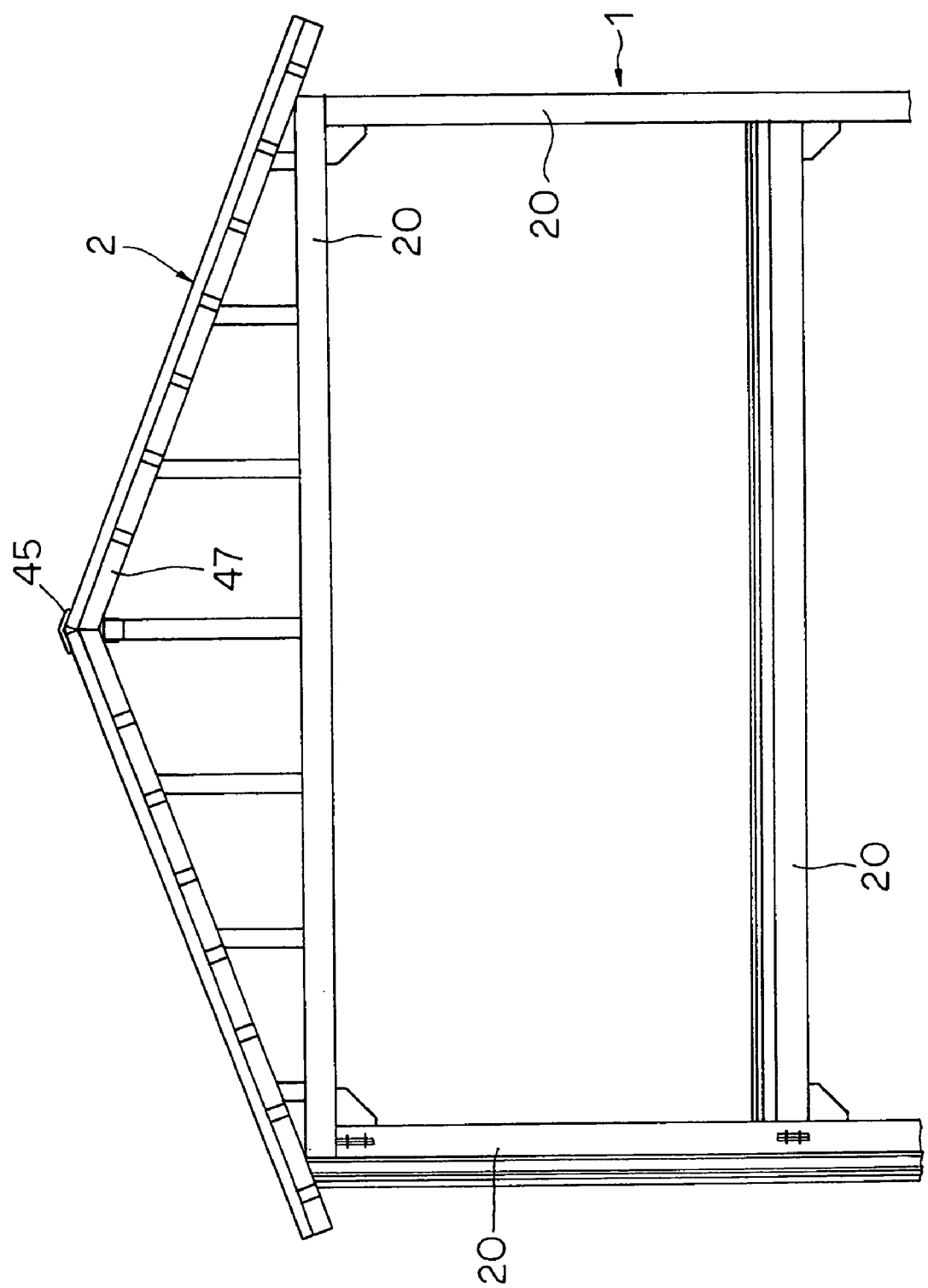
FIG. 10 is a referential diagram depicting one example of a roof for the building of this invention.
Figure 11:
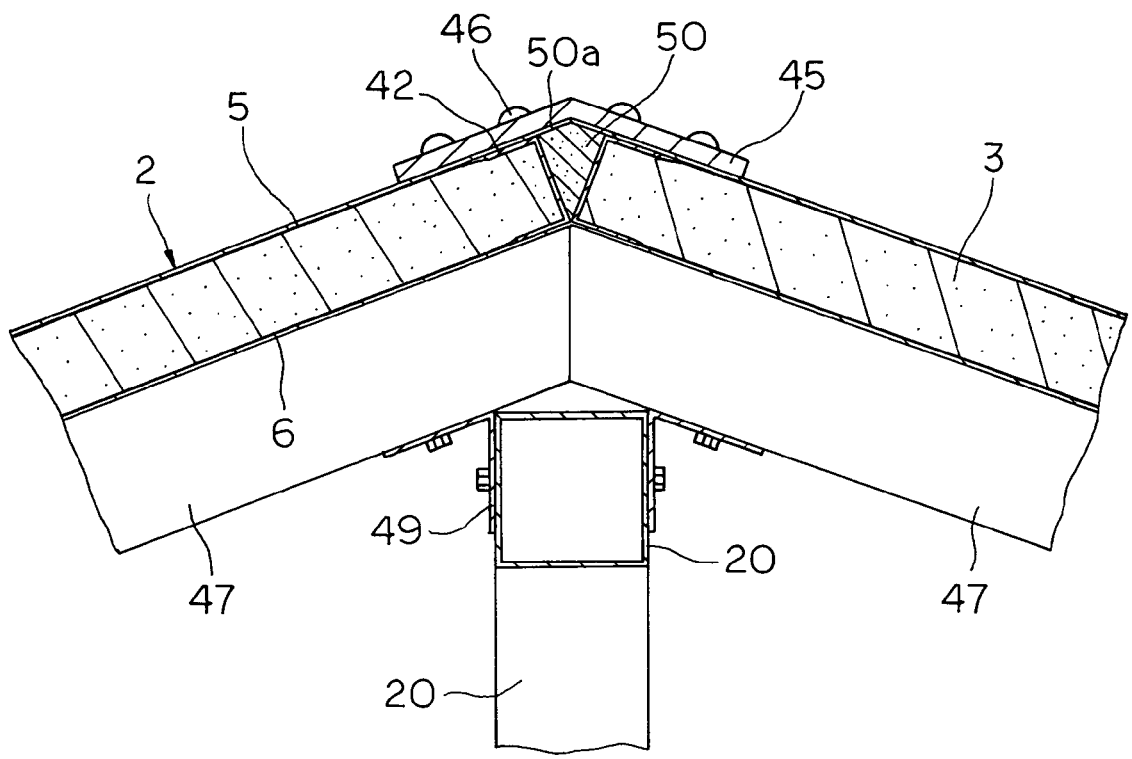
FIG. 11 is a partially enlarged diagram of FIG. 10.
Figure 12:
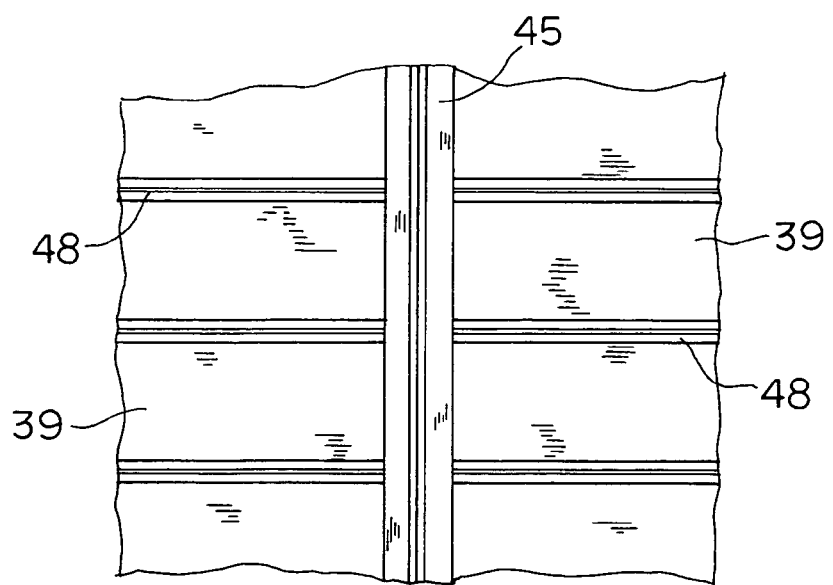
FIG. 12 is a referential plan view of FIG. 11.

FIG. 10 is a referential diagram depicting one example of the roof for the building of this invention. In the present example, the roof of the building 1 is constructed by using the structural facing 2. The roof may be constructed in the same manner as when the wall surface is constructed by using the facing 2 which is an outer panel as shown in the preceding example. The facing 2 is the same outer panel as used in constructing the wall surface. The fitting structure therefore can be executed substantially in the same manner as in the construction of the wall surface. In this case, the pieces of facing 2 can be attached by using the connecting members 10 and 11 to a retaining member 47 which is formed of rafters.

Figure 13:
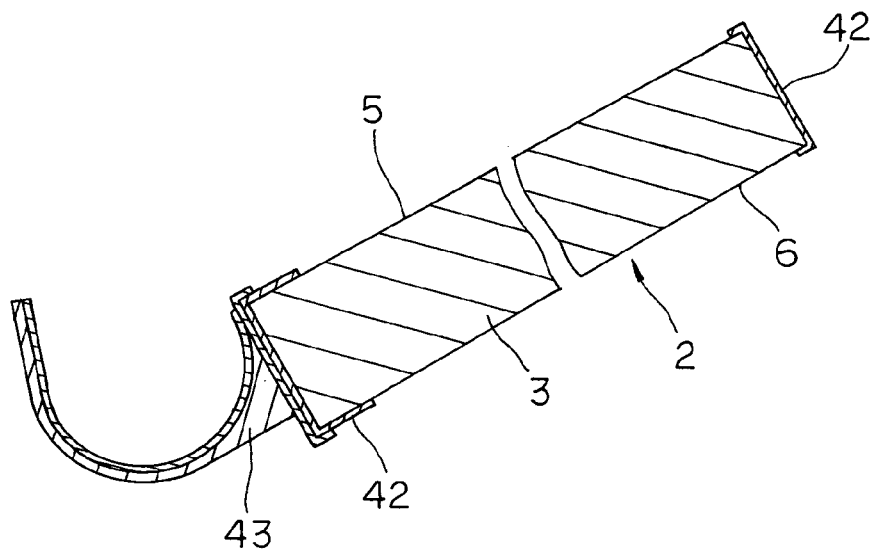
FIG. 13 is a cross section depicting structural facing.
Figure 14:
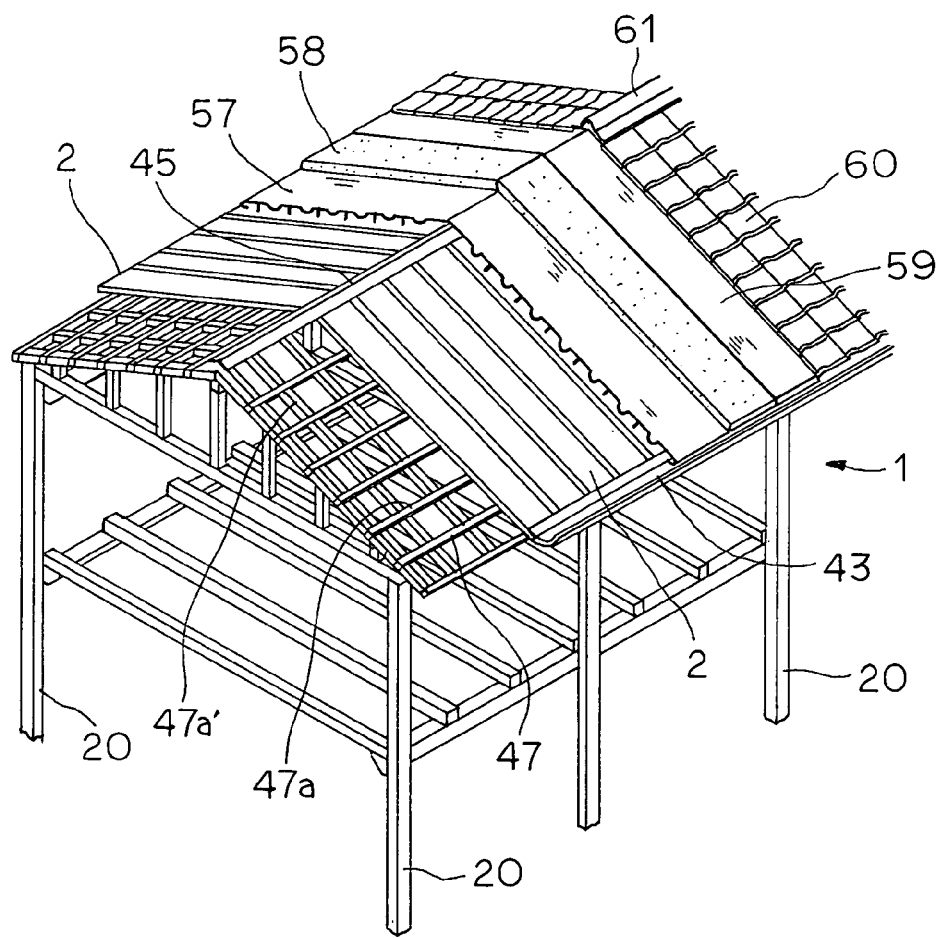
FIG. 14 is a referential perspective view of FIG. 10.

In the present example, the opposite terminal parts of the facing 2 are reinforced each with a reinforcing member 42 made of a metal in a cross section approximately in the shape of three sides of a square as illustrated in FIG. 13. Further, at the leading terminal position of the facing 2, a trough 43, is fixed in order to retain the rainwater trickling down the outer panel 5 and flowing down.

The roof to which the facing 2 is fixed may be so disposed advantageously as to incline with an angle of about 20 degrees from the horizontal direction. On the retaining member 47 formed of lateral pipes 47a and longitudinal pipes 47a' and intended as a framework for the building 1, the pieces of facing 2 are fitted in a concatenated pattern. In the region of the gap across which the reinforcing members 42 are opposed on the roofs top sides of the pieces of facing 2, an intervening member 50 formed by wrapping a sound absorbing material, such as glass wool, with a reinforcing member 50a is placed to fill the gap between the opposed reinforcing members 42, 42. The procedure to be followed in fitting the pieces of facing 2 to the retaining member 47 is the same as in constructing the wall surface.

The intervening member 50 has to be formed so as to conform to the gap arising between the opposed pieces of facing 2, 2. A ridge material 45 covers the intervening member 50 and the gap between the intervening member 50 and the facing 2, and this ridge material 45 is fixed with fixing members 46, such as bolts, to the facing 2. In the region of mutual union between the concatenated pieces of facing 2, a fitting 48 is fixed with means, such as a rivet, not shown in the diagram to prevent the gap from exposure.

After the pieces of facing 2 have been set in place, protecting plates 57 formed of a metallic material are laid or either laying members 58 produced by foaming plates of calcium carbonate or calcium silicate or aluminum plates 59, or both are laid so as to protect the pieces of facing 2. Further, clay tiles 60 are laid thereon and crestal tiles 61 are laid along the apex of the room to construct the roof of the building 1.

The clay tiles 60 and crestal tiles 61 may be formed of a suitable material, such as clay, asbestos slate or a metal, so as to suit the appearance the building 1.

Figure 15:
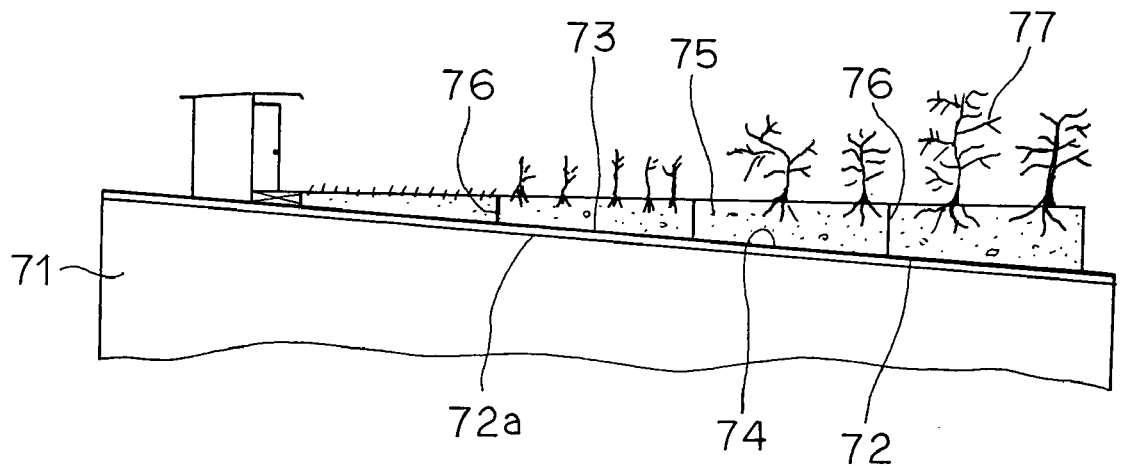
FIG. 15 is a side view depicting one example of the application of the structural facing of this invention to a shed roof.

FIG. 15 depicts the application of pieces of facing 2 that are outer panels to the roof of a building 71 that is possessed of a shed roof. The shed roof of this building 71 is preferred to be inclined with an angle of about 3 degrees. The pieces of facing 2 are laid so as to conform to this inclination.

On the pieces of facing 2, a waterproof sheet 73 formed of vinyl sheet or other similar plastic film sheet and endowed with an ability to resist water is fixed in place by means of thermal fusion. Onto this waterproof sheet 73, an aluminum sheet (plate member) about 1 mm in thickness is fixed. Then, pebbles 74 and soil 75 are layered substantially horizontally on the aluminum sheet and plants and grasses 77 are raised from the soil 75.

By numeral 76 is denoted a partition plate which is disposed in an elongate state in the front-rear direction in the bearings of FIG. 15 and erected substantially vertically on the pieces of facing 2. This partition plate 76 is formed so as to acquire a height coinciding with the soil 75 and pebbles 74. By disposing the partition plates 76 in such a manner as to partition the rooftop at intervals of a predetermined length, it is made possible to effect fast deposition of the soil 75 and pebbles 74 infallibly on the roof.

Figure 16:
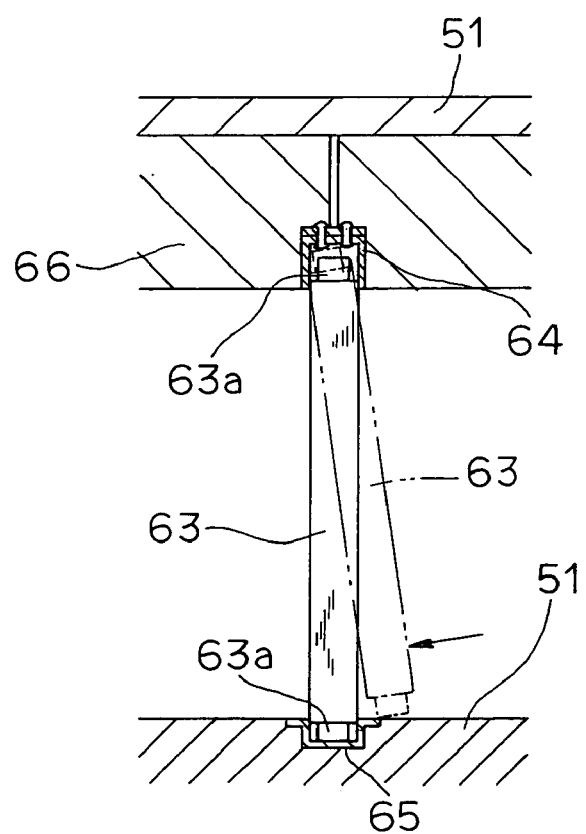
FIG. 16 is an explanatory diagram depicting a fitting structure for facing.

FIG. 16 depicts the fitting structure for facing 63 that is used as a partition of the interior of a building. The facing 63 in this example is provided near the upper and lower terminal parts thereof with inserting parts 63a, 63a. Concave front flanges 64 and 65 corresponding to the inserting parts 63a, 63a are embedded respectively in a ceiling wall 66 and a floor surface 51 of the building 1. For the purpose of fixing the facing 63, first the inserting part 63a at the upper terminal is inserted in the concave front flange 64, the facing 63 is pulled upward and set in a substantially vertical state and subsequently moved in the direction of an arrow mark, with the result that the lower inserting part 63a will be inserted home in the concave front flange 65 so as to fix the facing 63 and partition the interior of the building 1.

Incidentally, for use as the pieces of facing 63 in the present example, those pieces of facing which are used in constructing a wall surface or a roof may be adopted with necessary modifications.

Figure 17:
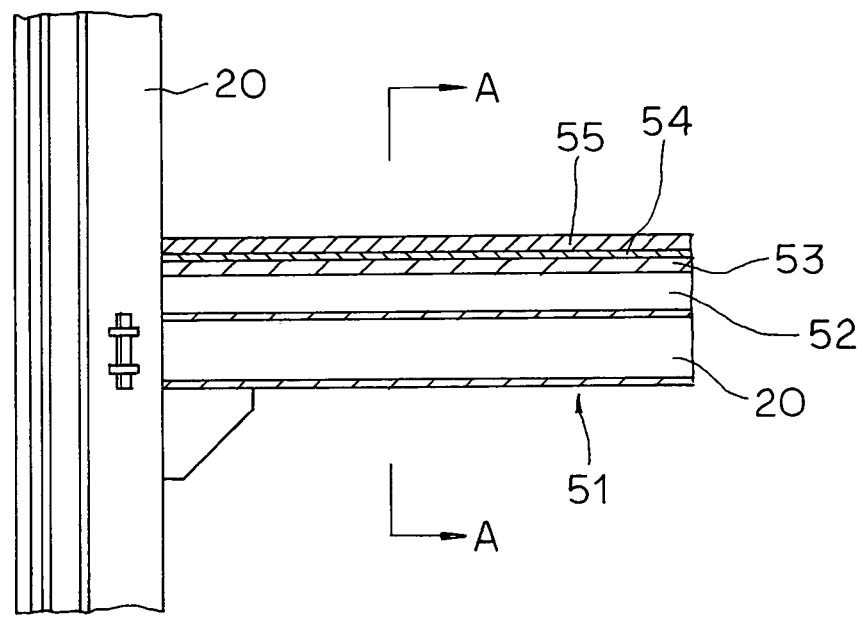
FIG. 17 is a cross section depicting the structure of a floor surface of a building.
Figure 18:
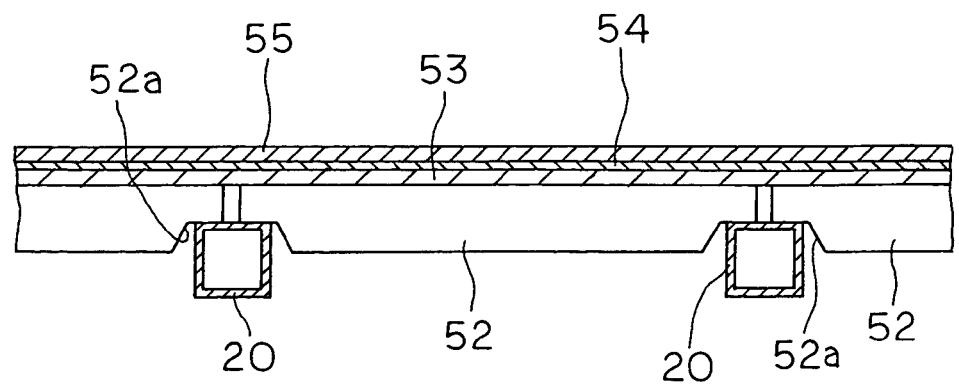
FIG. 18 is a cross section taken through FIG. 17 alone line A—A.

The floor structure of the building in this example is illustrated in FIG. 17.

The floor surface 51 is constructed by laying a concrete plate 52 on the support rod 20 disposed in the horizontal direction as a component of the framework, further superposing thereon a foamed plate 53 produced by solidifying a plate of raw material, such as calcium carbonate or calcium silicate, and a thin plate 54 molded of an elastomer as a material, and laying thereon a floor covering 55, such as a rush mat.

The concrete plate 52 is provided near the opposite terminal parts thereof with notched parts 52a. By mounting these notched parts 52a on the support rod 20, it is made possible to dispose the concrete plate 52 exactly at the predetermined position.

Figure 19:
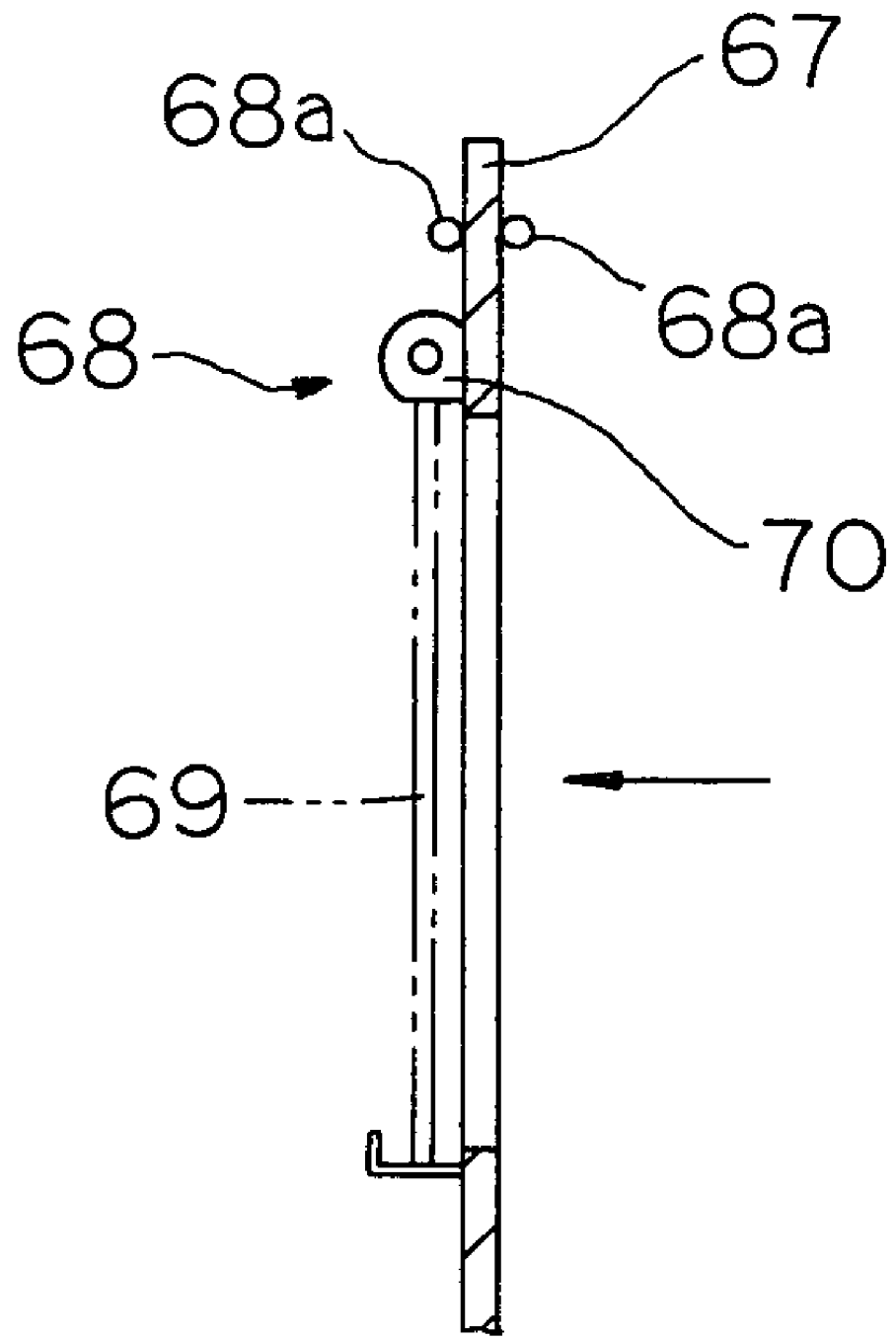
FIG. 19 is a side view depicting a fireproof shutter.

FIG. 19 is a side view depicting a fireproof shutter 68.

The fireproof shutter 68 is so attached to a window frame 67 of the building 1 that when sensors 68a, 68a disposed inside and outside the window frame detect heat of about 120° C. in case of a fire, this fireproof shutter 68 will lower a shutter part 69 accommodated as rolled in a retaining part 70 from the retaining part 70 to shut the window frame 67 and block the entry of fire and smoke in the direction of an arrow mark.

Now, the operation of the building that uses the pieces of structural facing contemplated by this invention will be described below.

The construction of the wall surface of the building of this invention permits a liberal cut in the cost thereof because the pieces of facing 2, 2 can be concatenated by using the connecting members 10 and 11 and because these connecting members 10 and 11 can be produced inexpensively on account of their simple structure.

In the concatenation of the pieces of facing 2, 2, the labor required for the execution of the relevant work can be saved and the time required for the work can be cut because the pieces of facing 2, 2 can be easily attached to the furring strips 4 and the retaining members 47 forming the framework of the building 1 by using the connecting members 10 and 11.

The core material 3 of the facing 2 is formed of material, such as calcium carbonate or calcium silicate. Thus, the facing 2 excels in heat-insulating property and sound-insulating property and possesses high durability. Further, it can be used as a partition besides a wall surface and a roof because it is lightweight. Since it can be applied to all portions as building members for constructing a building 1, it avoids adding to the number of parts and permits a liberal cut in the cost. Optionally, the core material 3 may be formed of a material other than calcium carbonate or calcium silicate, such as a hard foamed polyurethane board.

Further, the core material 3 excels in resistance to water and prevents the moisture condensation because the elongate panels 5 and 6 that cover the core material 3 are galvanized and coated with a front preventing agent.

Since the frame 29 can be attached to the facing 2 and the outer wall member 30 can be attached to the rail 32 that has been fixed to the frame 29, the outer wall surface of the building 1 can be easily constructed without entailing heavy consumption of time and labor. Moreover, since the outer wall members 30 can be individually removed and replaced with a new supply, the wall surface on being defiled or fractured does not need to be wholly rebuilt or reformed but can be repaired at a lowered cost.

As clearly noted from the foregoing description, the building using the structural facing of this invention can exalt the feasibility of the construction by simplifying the operation of construction and the facing itself can be applied to all conceivable portions of the building. Thus, this invention promises a liberal cut in the cost incurred by the construction.

The connecting members that are used in concatenating the adjoining pieces of facing can be easily manufactured and disposed at a low cost because they have a simple structure.

The building that has been constructed is capable of providing a structure that manifests an outstanding heat-insulating and sound-insulating property and excels in durability as well.

The pieces of facing can be fitted to all conceivable portions of a building. When they are to be fitted to the wall surface, they can be easily fixed to the furring strips by the use of the connecting members.

On the building that has used the pieces of structural facing contemplated by the invention, an outer wall surface may be constructed. The outer wall surface permits easy attachment and allows partial replacement. Further, the outer wall members can be mass-produced inexpensively by extrusion molding or draw molding.

Further, when the outer wall surface is constructed with tiles, it can enjoy a further enhanced decorative effect.

When the pieces of facing are to be attached to the roof, they can be fixed to the retaining members that form the framework of the building.

By fixing the pieces of facing to the retaining members of the shed roof, it is made possible to raise plants and flowers on the top of the roof of the building.

Moreover, the pieces of facing contemplated by this invention can be used as inner walls of a building and can provide partitioning walls for a building that has been constructed.

What is claimed is:

1. A building wall comprising:
   a plurality of pieces of structural facing, wherein each of the pieces of structural facing is comprised of an elongate outer panel made of a steel sheet, an elongate inner panel made of a steel sheet, and a heat-insulating and sound-insulating core material nipped between the inner and outer panels, wherein the outer panel has a bent part formed in an end thereof so as to extend in a width direction of the pieces of structural facing, the bent part having an end portion extending toward the inner panel and folded so as to form a first folded part, wherein the inner panel has a second folded part formed in an end thereof, the second folded part of the inner panel being joined to the first folded part of the outer panel; and a plurality of connecting members having fitting members, respectively, each of the connecting members being disposed in the width direction of the pieces of structural facing with the fitting members thereof being meshed with the bent part of the outer panel or the second folded part of the inner panel to concatenate adjoining ones of the pieces of structural facing, thereby constructing an outer wall surface, wherein each of the connecting members comprises a rod member having first and second terminal portions, wherein the first terminal portion includes a male thread, and the second terminal portion is provided with a fitting part that is received in an insertion hole of the fitting member and includes a tying member provided at an end thereof, wherein, when the fitting part is received in the insertion hole, the rod member is prevented from rotating relative to the fitting member.

2. The building wall as claimed in claim 1, further comprising a furring strip disposed adjacent the pieces of structural facing, and a shielding member disposed between the furring strip and the pieces of structural facing, wherein each of the connecting members includes a rod member having a threaded portion, and a nut received on the threaded portion of the rod member, wherein the rod members of a number of the connecting members penetrates the shielding member and the furring strip so that the fitting portions thereof are drawn into engagement with the second folded part as the nuts are threaded on the rod members.

3. The building wall as claimed in claim 2, further comprising:

a plurality of frames fixed to the pieces of structural facing;

a plurality of rails fixed to the frames and extending perpendicularly thereto, wherein the rails include a plurality of upwardly turned hooks; and an outer wall member having groove parts and hanging on the hooks through the groove parts, wherein the pieces of structural facing, the frames, the rails and the outer wall member constitute an outer wall surface of the building wall.

4. The building wall as claimed in claim 1, further comprising:

a plurality of frames fixed to the pieces of structural facing;

a plurality of rails fixed to the frames and extending perpendicularly relative to the frames, wherein the rails include a plurality of hooks; and an outer wall member having groove parts and hanging on the hooks through the groove parts, wherein the pieces of structural facing, the frames, the rails and the outer wall member constitute an outer wall surface of the building wall.

5. The building wall as claimed in claim 1, wherein the connecting members comprise a plurality of first connecting members in which the fitting members thereof are meshed with the bent parts of adjoining outer panels, and a plurality of second connecting members in which the fitting members thereof are meshed with the second folded parts of adjoining inner panels.

6. A building wall comprising:

a plurality of pieces of structural facing, wherein each of the pieces of structural facing is comprised of an elongate outer panel formed of a steel sheet, an elongate inner panel made of a steel sheet, and a heat-insulating and sound-insulating core material nipped between the inner and outer panels, the outer panel having a bent part formed in an end thereof so as to extend in a width direction of the piece of structural facing, the bent part having an end portion extending toward the inner panel and folded so as to form a first folded part, the inner panel having a second folded part formed in an end thereof, the second folded part of the inner panel being joined to the first folded part of the outer panel;

a plurality of connecting members each of which has a fitting member, each of the connecting members being disposed in the width direction of the pieces of structural facing with the fitting member being meshed with the bent part of the outer panel or the second folded part of the inner panel in order to concatenate adjoining ones of the pieces of structural facing;

a plurality of frames fixed to the pieces of structural facing;

a plurality of rails fixed to the frames and extending perpendicularly thereto, wherein the rails include a plurality of upwardly turned hooks; and an outer wall member having groove parts and hanging on the hooks through the groove parts, wherein the pieces of structural facing, the frames, the rails and the outer wall member constitute an outer wall surface of the building wall.

7. The building wall as claimed in claim 6, further comprising a furring strip disposed adjacent the pieces of structural facing, and a shielding member disposed between the furring strip and the pieces of structural facing, wherein a number of the connecting members each includes a rod member having a threaded portion, and a nut received on the threaded portion of the rod member, wherein the rod member penetrates the shielding member and the furring strip so that the fitting portion is drawn into engagement with the second folded part as the nut is threaded on the rod member.

8. The building wall as claimed in claim 6, wherein the connecting members comprise a plurality of first connecting members in which the fitting members thereof are meshed with the bent parts of adjoining outer panels, and a plurality of second connecting members in which the fitting members thereof are meshed with the second folded parts of adjoining inner panels.

* * * * *